No. 654,438. Patented July 24, 1900.
E. W. CLARK.
SNOW GUARD FOR ROOFS.
(Application filed Apr. 12, 1899. Renewed Apr. 25, 1900.)
(No Model.)
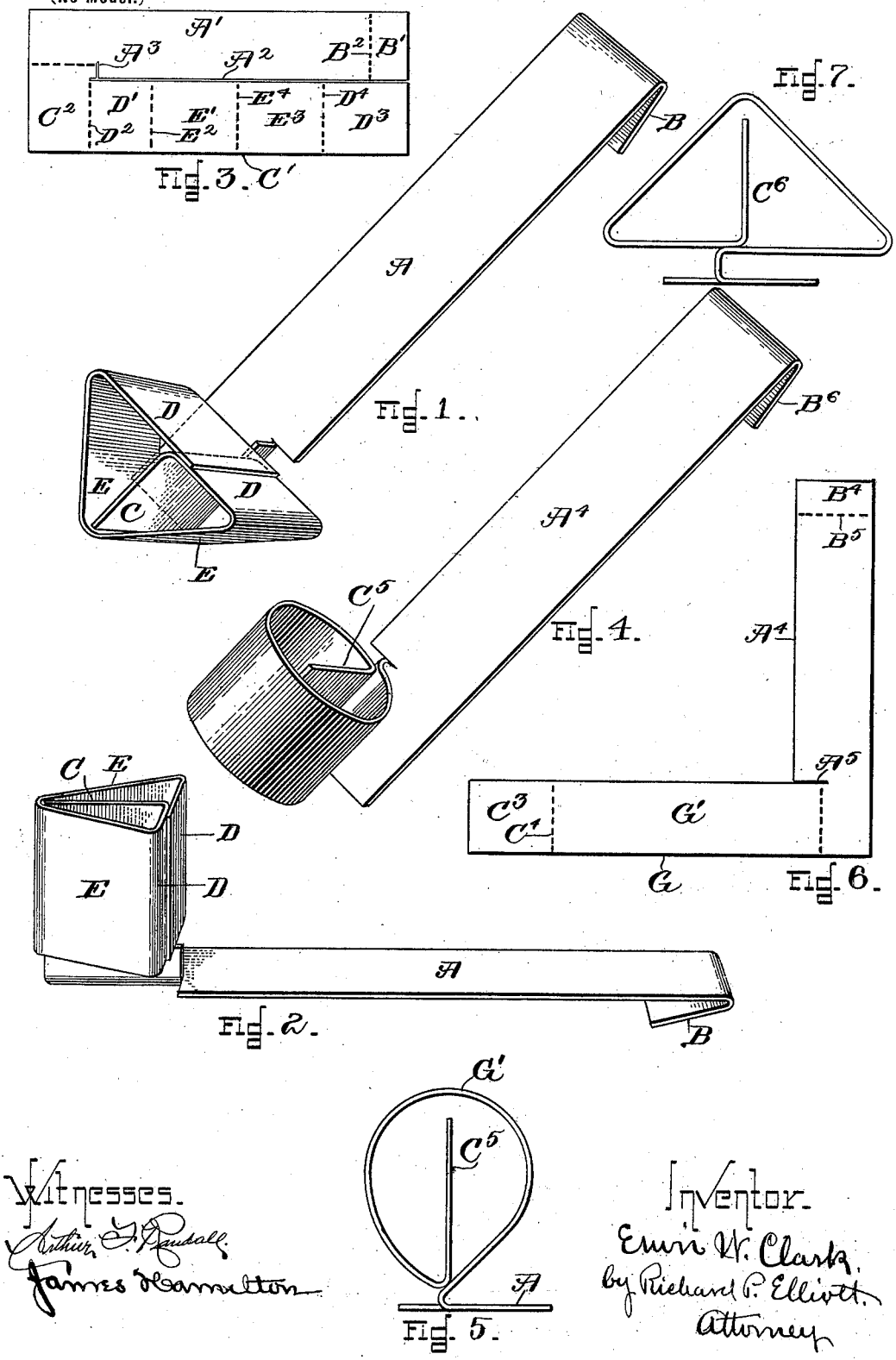

United States Patent Office.

EMRI W. CLARK, OF NASHUA, NEW HAMPSHIRE.

SNOW-GUARD FOR ROOFS.

SPECIFICATION forming part of Letters Patent No. 654,438, dated July 24, 1900.

Application filed April 12, 1899. Renewed April 25, 1900. Serial No. 14,354. (No model.)

*To all whom it may concern:*

Be it known that I, EMRI W. CLARK, of Nashua, in the county of Hillsborough and State of New Hampshire, have invented a new and useful Improvement in Snow-Guards, of which the following is a specification, reference being had to the accompanying drawings, in which—

Figure 1 is a perspective view of my improved snow-guard, viewing the guard from above. Fig. 2 is a perspective view of my improved snow-guard, viewing the guard from the side. Fig. 3 is a top plan view of the blank from which my new snow-guard is made. Fig. 4 is a perspective view of a modified form of my new snow-guard, viewing the guard from above. Fig. 5 is an end elevation of the modified form shown in perspective, Fig. 4. Fig. 6 is a top plan view of the blank from which the modified forms shown in Figs. 4 and 7 are made. Fig. 7 is an end elevation of a modified form.

The object of my invention is to provide a snow-guard which will be simple in construction, cheap in manufacture, and efficient in use.

My invention consists in the snow-guard hereinafter described and claimed.

In the drawings illustrating the principle of my invention and the best mode now known to me of applying that principle, A is a thin body portion, one end of which is bent to form a hook B. Integral with the other end is the guard-piece made up of an upright mid-piece C, the wings D D, and the sides E E. In producing this guard from the blank shown in Fig. 3 the blank is cut through a part of its length along the center line $A^2$, and near the inner end of this cut a short cut $A^3$ is made at right angles to the cut $A^2$. The half $A'$ forms the body portion A, and the portion $B'$ is bent upon the dotted line $B^2$ to form the hook B. The half $C'$ is bent at right angles to the portion $A'$, the part $C^2$ forming the upright mid-piece C. The portion $D'$ is bent on the line $D^2$ to form one of the wings D. The portion $E'$ is bent on the line $E^2$ to form one of the wings E, and the portion $E^3$ is bent on the line $E^4$ to form the other wing E, the line of bend $E^4$ being in rear of and parallel with the rear edge of the upright mid-piece C. The structure is completed by bending the end portion $D^3$ on the line $D^4$ to form the other wing D, which overlaps the bend on the line $D^2$, as shown.

In the modification shown in Fig. 4 the end portion $B^4$ of the blank shown in Fig. 6 is bent on the line $B^5$ to form the hook $B^6$. The portion G is at right angles with the portion $A^4$, which forms the body portion of my snow-guard, and is separated therefrom by a cut $A^5$. The portion $C^3$ is bent on the line $C^4$ to form the upright mid-piece $C^5$, and the remaining portion $G'$ of the part G is bent into the curved form shown in Fig. 5.

The modification shown in Fig. 7 is made from the blank shown in Fig. 6 by bending the portion G, first, vertically upward; second, horizontally outward; third, obliquely upward and inward; fourth, obliquely downward and outward; fifth, horizontally inward, and, lastly, vertically upward to form the mid-piece $C^6$. The wings D D in Fig. 1 may be soldered or riveted together where they overlap and the mid-piece may be soldered to the sides E E.

The snow-guard shown herein can be made from one piece of sheet metal stamped into the shape shown. The sheet metal is cheap, the process of stamping costs little, and the bending to form the snow-guard costs little. The whole structure is one of the cheapest possible, and at the same time the snow-guard adds to the appearance of the roof.

The herein-described snow-guard is an improvement over that shown in Letters Patent No. 625,144, granted me May 16, 1899, especially in the matters of strength, cheapness of production, and ease with which it may be manufactured.

What I claim is—

A snow-guard made from a single blank of sheet metal and comprising a flat body portion having a downwardly-turned hook at one end and an upwardly-projecting guard-piece at the other end; said guard-piece being made up of an upright mid-piece, wings projecting sidewise therefrom, and sides extending obliquely and rearwardly from said wings.

In testimony whereof I have signed my name to this specification, in the presence of two subscribing witnesses, this 8th day of April, A. D. 1899.

EMRI W. CLARK.

Witnesses:
TYLER M. SHATTUCK,
S. E. JAQUITH.